United States Patent [19]
Foucher et al.

[11] Patent Number: 5,786,410
[45] Date of Patent: Jul. 28, 1998

[54] POLYURETHANE DYE BASED INKS

[75] Inventors: Daniel A. Foucher, Toronto; Guerino G. Sacripante, Oakville; Marcel P. Breton, Mississauga; Patricia A. Burns, Milton, all of Canada

[73] Assignee: Xerox Corporation, Stamford, Conn.

[21] Appl. No.: 829,300

[22] Filed: Mar. 31, 1997

[51] Int. Cl.$^6$ ............................................. C09D 11/10
[52] U.S. Cl. ............................................. 523/161
[58] Field of Search ...................................... 523/161

[56] References Cited

U.S. PATENT DOCUMENTS

| | | | |
|---|---|---|---|
| 4,532,530 | 7/1985 | Hawkins | 346/140 R |
| 4,737,190 | 4/1988 | Shimada et al. | 106/22 |
| 5,096,671 | 3/1992 | Kane | 422/82.07 |
| 5,156,675 | 10/1992 | Breton et al. | 106/22 |
| 5,207,824 | 5/1993 | Moffatt et al. | 106/22 R |
| 5,240,780 | 8/1993 | Tiers | 428/483 |
| 5,348,832 | 9/1994 | Sacripante et al. | 430/109 |
| 5,372,987 | 12/1994 | Fisch | 503/227 |

*Primary Examiner*—Paul R. Michl
*Attorney, Agent, or Firm*—E. O. Palazzo

[57] ABSTRACT

An ink composition comprised of (a) water, and a dye containing sulfonated component of the following formula

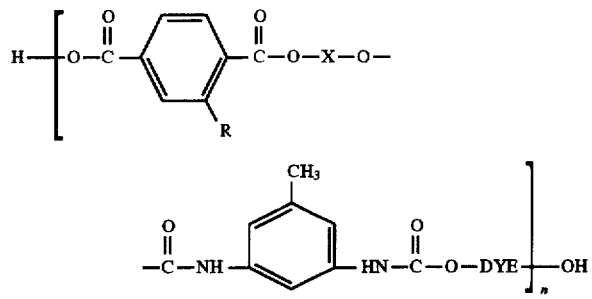

wherein R is m(H) and O($SO_3$—$Y^+$), wherein H is hydrogen, Y is an alkali cation or an alkaline earth cation, m is the mol fraction of hydrogen, and O is the mol fraction of sulfonate ($SO_3$—$Y^+$); X is a glycol, and n represents the number of repeating segments.

37 Claims, No Drawings

5,786,410

POLYURETHANE DYE BASED INKS

PENDING PATENT APPLICATIONS

Illustrated in copending application U.S. Ser. No. 664, 597, the disclosure of which is totally incorporated herein by reference, is a process for the preparation of inks comprised of i) flushing pigment into a sulfonated polyester resin, and which resin possesses a degree of sulfonation of from between about 2.5 and about 20 mol percent;

ii) dispersing the pigmented polyester resin in water at a temperature of from about 40° C. about 95° C. by a polytron shearing device operating at speeds of from about 100 to about 5,000 revolutions to yield stable pigmented submicron sized particles of from about 5 to about 150 nanometers; and thereafter separating said submicron particles and mixing said submicron particles with water. Also, certain inks with sulfopolyester dye resins are illustrated in pending applications U.S. Ser. No. 663,410 U.S. Ser. No. 663,420, U.S. Pat. No. 5,648,193 and U.S. Ser. No. 664,597, now abandoned, the disclosures of each being totally incorporated herein by reference.

BACKGROUND OF THE INVENTION

The present invention is generally directed to inks, and more specifically, thermal ink jet inks and processes thereof. In embodiments, the present invention is directed to aqueous dispersions of cyan, magenta, yellow, and black polymeric dyes for utilization as particulate or colored particulate inks, and wherein the dyes are comprised of alternating sulfopolyester and dye chromophore segments bridged by a urethane linking segment, and moreover, which inks possess excellent waterfastness and excellent print quality characteristics, and which inks can be selected for various printing processes such as thermal ink jet and acoustic ink jet processes. The present invention in embodiments thereof enables the utilization of polymers obtained by polycondensation reactions, such as polyesters, and more specifically, the sulfonated polyesters as illustrated in U.S. Pat. No. 5,348, 832, and U.S. Pat. No. 5,604,073, the disclosures of which are totally incorporated herein by reference. Thermal ink jet printing processes are described in more detail, for example, in U.S. Pat. Nos. 5,169,437 and 5,207,824, the disclosures of which are totally incorporated herein by reference.

The following are generally desired for inks utilized in ink jet printing processes (1) the ink should possess liquid properties, such as viscosity, surface tension and electric conductivity, substantially equal to the discharging conditions of the printing apparatus, such as the driving voltage and driving frequency of a piezoelectric electric oscillator, the form and material of printhead orifices, the diameter of orifices, and the like;

(2) the ink should be capable of being stored for extended time periods without causing clogging of the printhead orifices during use;

(3) the recording liquid should be quickly fixable onto the recording media, such as paper, film, and the like, such that the outlines of the resulting ink dots are smooth and there is minimal blotting of the dotted ink;

(4) the resultant ink image should be of high quality, such as having a clear color tone and high density. The ink image should also have high gloss and high color gamut;

(5) the resultant ink image should exhibit excellent waterfastness (water resistance) and lightfastness (light resistance);

(6) the ink should not chemically attack, corrode or erode surrounding materials, such as the ink storage container, printhead components, orifices, and the like;

(7) the ink should not have an unpleasant odor and should not be toxic or inflammable; and (8) the ink should exhibit low foaming and high pH stability characteristics.

PRIOR ART

Various inks for ink jet printing processes are known in the art.

For example, various ink jet inks are disclosed in U.S. Pat. Nos. 4,737,190 and 5,156,675. Generally, the ink jet inks of the prior art are aqueous inks comprising a major amount of water, a humectant and/or a cosolvent, and a dye. By selecting specific humectants, dyes, or other components, adjustment of the print characteristics of the resultant ink may be achievable.

Ink jet printing systems can generally be classified as continuous stream and drop-on-demand. In drop-on-demand systems, a droplet is ejected from an orifice directly to a position on a recording medium in accordance with digital data signals. A droplet is not usually formed or expelled unless it is to be placed on the recording medium. A second type of drop-on-demand system is known as thermal ink jet, or bubble jet. With this type, there are apparently generated high velocity droplets and there is allowed very close spacing of the nozzles. Thermal ink jet processes are well known as indicated herein, and are described, for example, in U.S. Pat. Nos. 4,601,777; 4,251,824; 4,410,899; 4,412, 224 and 4,532,530, the disclosures of each of which are totally incorporated herein by reference.

Known ink jet inks generally comprise a water soluble dye which is soluble in an ink vehicle such as water or a mixture comprising water and a known water soluble or water miscible organic solvent. Inks comprising these soluble dyes may exhibit many problems, such as poor waterfastness, poor lightfastness, clogging of the jetting channels as a result of solvent evaporation and changes in the solubility of the dye, dye crystallization, ink bleeding when prints are formed on plain papers, poor thermal stability, chemical instability, ease of oxidation, and low drop velocity. In addition, many of these known dyes contained in inks may be potentially toxic or mutagenic.

Heterophase ink jet inks are known. For example, U.S. Pat. No. 4,705,567, the disclosure of which is totally incorporated herein by reference, discloses a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion is comprised of a polymer obtained from monomers having mainly polymerizable vinyl groups into which hydrophilic portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 4,877,451, the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents. In addition, in U.S. Pat. No. 5,378,574, the disclosure of which is totally incorporated herein by reference, there are illustrated ink jet inks and liquid developers containing colored particles comprising hydrophilic porous silica particles to the surfaces of which dyes are covalently bonded through silane coupling agents. The ink compositions of this patent are believed to be less stable in the printheads, and less stable during storage, disadvantages avoided, or minimized with the inks of the present invention.

In U.S. Pat. No. 5,120,361, the disclosure of which is totally incorporated herein by reference, there is disclosed an ink composition comprised of a solution comprised of a dendrimer and a dye or dyes, which dyes are visible, or can be seen under normal viewing conditions, and wherein the dendrimer can be a first, second or third generation dendrimer.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means, such as a pulse converter, and then applied to the piezoelectric oscillator. A change in pressure on the ink within an ink chamber in the printhead caused by the recording signal results in droplets of ink being ejected through an orifice to a recording medium. Such an ink jet system is described in more detail, for example, in U.S. Pat. No. 4,627,875, the disclosure of which is totally incorporated herein by reference.

In these and other ink jet recording processes, it is important that the ink being used meet various stringent performance characteristics. These performance characteristics are generally more stringent than those for other liquid ink applications, such as for writing instruments, a fountain pen, felt pen, and the like.

U.S. Pat. No. 5,364,462, the disclosure of which is totally incorporated herein by reference, describes dye-based inks that are described as providing improved stability, jetting characteristics, solubility and waterfastness. The aqueous dye-based ink includes a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone, may also be added to the ink to improve the solubility and stability of the dye solution.

Sulfopolyester resins are known and are generally available commercially from Eastek Inks, a business unit of Eastman Chemical Company. These sulfopolyester resins are suitable for use in overprint lacquers and primers, as described in Kenneth R. Barton, "Sulfopolyesters: New Resins for Water-Based Inks, Overprint Lacquers and Primers", *American Ink Maker*, pp. 70 to 72 (October, 1993).

Although numerous ink jet inks are presently available, they generally do not meet all of the requirements indicated herein, while also providing excellent print quality on plain paper. In particular, the inks generally used in ink jet printing processes, while generating acceptable print quality, may not produce the high print quality that is achieved by using dry toner compositions, such as in electrostatographic imaging processes. A need continues to exist for improved ink jet inks, and processes for producing the same, that satisfy many of the requirements indicated herein, while providing high quality prints on a wide variety of recording media, including plain paper. Although some currently available ink jet inks may provide waterfast images with better substrate latitude, the inks may be unacceptable in that they generally smear and have poor latency and maintainability characteristics. In addition, such inks are generally difficult to manufacture. Thus, there remains a need in the ink jet ink industry for improved black and colored inks that can be easily prepared and can be obtained at a lower cost. There also remains a need for inks and processes wherein a spontaneous emulsion is formed at, for example, a temperature slightly higher than the glass transition temperature of the resin, that is the colored particles selected as dissipatible in water. Moreover, there is a need for certain colored inks, such as cyan and yellow, with excellent color intensity and wherein the emulsions selected is of a particulate size range of from about 10 to about 120 nanometers. These and other need may be achievable in embodiments of the present invention.

SUMMARY OF THE INVENTION

The present invention provides inks, and processes for generating ink jet ink compositions that have excellent waterfastness and high print quality on a wide variety of print media, including paper and transparencies. Ink compositions prepared by processes of the present invention possess in embodiments, for example, a wide or variety color gamut, high gloss, lightfastness, high stability, improved drying time, reduced intercolor bleed, reduced odor retention, minimal, or substantially no toxicity, and compatibility with the ink jet printing environment and apparatus, and significantly improved print quality on plain paper, as compared to a number of other known ink compositions. Also, the present invention provides ink compositions having improved adhesion of pigments on print media while allowing for a higher loading of colorant in the ink.

In embodiments, the present invention relates to inks and a process for the preparation thereof, which inks are comprised of water, known optional ink additives, an optional cosolvent, and a colored dissipatible sulfopolyester/urethane resin particles prepared, for example, by the reaction, in the presence of a catalyst, of a low molecular weight sulfopolyester oligomer, a dihydroxyterminated dye, and a diisocyanate, and which reaction is accomplished by heating the aforementioned components, followed by cooling, and wherein in embodiments the heating is at a temperature of from about 25° C. to about 80° C. The colored resin particles are dissipatible in water, that is they form spontaneous emulsions as indicated herein. The polymeric dyes selected for the invention inks are generally comprised of alternating sulfopolyester and dye chromophore segments linked as indicated.

Embodiments of the present invention relate to ink compositions comprised of (a) water, and a dye containing sulfonated component of the following formula, wherein R is both or together m(H), and osulfonate, wherein H is hydrogen, n is a number, and m is a number, X is a glycol, and n represents the number of repeating segments and more specifically, wherein R is m(H) and O(SO$_3$—Y$^+$), wherein H is hydrogen, Y is an alkali cation or an alkaline earth cation, m is the mol fraction of hydrogen, and O is the mol fraction of sulfonate (SO₃—Y⁺);

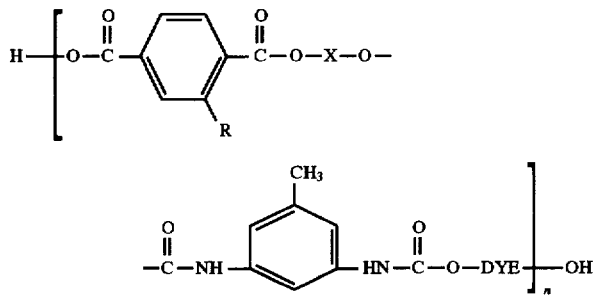

wherein the sulfonated component is an oligomer comprised of alternating sulfopolyester and dye chromophore segments linked as indicated, and wherein m is a number mol fraction of hydrogen of from about 0.8 to about 0.95, and preferably from about 0.85 to about 0.90, and more preferably about 0.925; O is a number mol fraction of sulfonate, especially sodium sulfonate, of from about 0.2 to about 0.05, preferably from about 0.1 to about 0.2, and more preferably about 0.075; and n is a number of from about 1 to about 7; an ink wherein n is about 0.925, and m is about 0.075; an ink wherein the sulfopolyester component is an oligomer with a weight average molecular weight of about 5,000; an ink wherein the sulfopolyester component is an oligomer with a weight average molecular weight of from about 1,000 to about 10,000; an ink wherein the sulfopolyester component contains from about 40 to about 60 weight percent of sulfonated polyester, from about 40 to about 60 weight percent of dye, and from about 2 to about 5 weight percent of said linking component, and wherein said three weight percentages total about 100; an ink wherein about 50 mole percent of the glycol is present; an ink wherein the X glycol is comprised of a mixture of a first glycol, and a second glycol, and wherein the first glycol is present in an amount of from about 25 to about 75 mole percent, and the second glycol is present in an amount of from about 25 to about 75 mole percent, and wherein the total weight percent of the first and second glycol is about 100; and an ink wherein the X glycol is an aliphatic glycol with, for example, from about 1 to about 20 carbon atoms, and more specifically, an alkylene glycol, wherein alkylene contains from 1, and preferably 2 to about 20 carbon atoms, such alkylenes including methylene, ethylene, propylene, butylene, hexylene, and the like. With the inks of the present invention, the sulfopolyester is linked by covalent bonding and embodiments thereof.

The liquid vehicle can be comprised of various known components, such as water, a mixture of water and a miscible organic component, such as a glycol, like ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; biocides; other water miscible materials, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally functions as a humectant which has a boiling point higher than that of water (100° C.). The ink liquid vehicle components, that is for example the water, the humectants, and the like, generally possess absorption characteristics on paper and evaporation properties allowing for the desired ink jet printing speed when the ink is to be used in an ink jet printing process. With the inks of the present invention, in embodiments the liquid vehicle can be present in an amount of, for example, from about 50 to about 99.5 percent by weight, and preferably from about 75 to about 99 percent by weight.

Optional additives can also be present in the inks of the present invention as indicated herein. For example, one or more surfactants or wetting or dispersing agents can be added to the ink. These additives may be of the cationic, anionic, amphoteric, or nonionic types. Suitable surfactants and wetting or dispersing agents include TAMOL® SN, TAMOL® LG, those of the TRITON® series available from Rohm and Haas Company, those of the MARASPERSE® series, those of the IGEPAL® series available from GAF Company, those of the TERGITOL® series, STRODEX PK-90™ available from GAF, PLURONIC F-68™ available from BASF, KARASPERSE TU™ available from Marasperse, and other commercially available surfactants. These surfactants and wetting agents are present in any effective amounts, generally from 0 to about 15 percent by weight, and preferably from about 0.01 to about 8 percent by weight.

Polymeric additives or dispersants in effective amounts of, for example, 1 to about 15 weight percent for enhancing the viscosity of the ink can also be added to the inks of the present invention. Examples include water soluble polymers, such as gum arabic, polyacrylate salts, polymethacrylate salts, polyvinyl alcohols, hydroxypropylcellulose, hydroxyethylcellulose, polyvinylpyrrolidinone, polyvinylether, starch, polysaccharides, sodium salt of naphthalene sulfonate formaldehyde copolymer, sodium salt of alkylbenzene sulfonate, sodium salt of dialkylsulfosuccinate, sodium salt of lignosulfonate, sodium alkylene oxide copolymer, sodium salt of alkyletherphosphate, and the like. In addition, polymers such as hydroxypropylpolyethyleneimine (HPPEI-200) or other polyethyleneimine derivatives can be added to the ink.

Other optional additives for further improving the jetting characteristics and the storage stability of the inks, and for preventing undesirable interactions of the inks with the printhead either during the jetting process or while the printer is idle for the inks of the present invention include humectants such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight; and pH controlling agents, such as acids or bases, phosphate salts, carboxylate salts, sulfite salts, amine salts, and the like, present in an amount of from 0 to about 5 percent by weight and preferably from about 0.01 to about 2 percent by weight, bases present in an amount of from 0 to about 10 percent by weight and preferably from about 4 to about 8 percent by weight, or the like.

The ink vehicle selected for the invention inks, that is the sulfopolyester urethane of the formula illustrated herein, is more specifically comprised of sulfopolyester and chromophore bridged by spacer segment through diisocyanate linkages, and these vehicles are generally prepared as outlined in Scheme 1, wherein the substituents are as illustrated herein.

REACTINT® BLUE X19, magenta REACTINT® RED X52, REACTINT® YELLOW X15, REACTINT® BLACK 57AB, REACTINT® BLACK X40LV, REACTINT® ORANGE X38, REACTINT® VIOLET X80, mixtures thereof, and the like. The sulfopolyurethanes are prepared

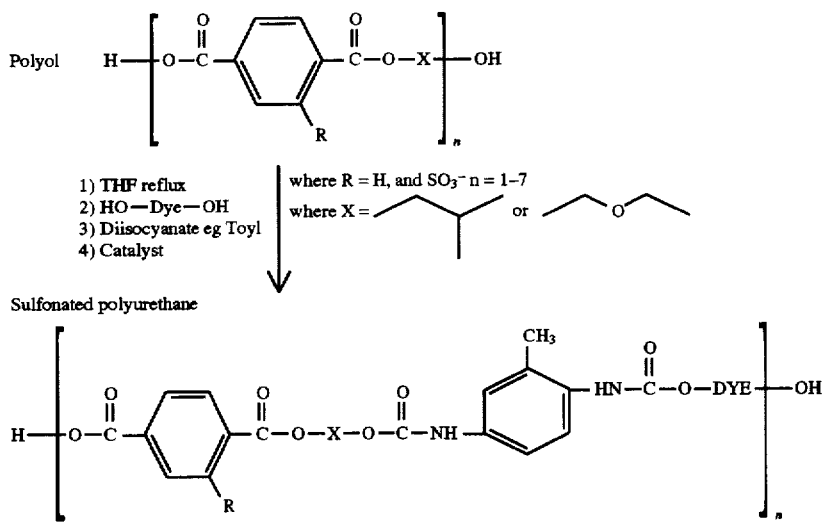

SCHEME 1
SYNTHESIS OF LINEAR SULFONATED POLYURETHANE

More specifically, the sulfopolyester component containing a dye (DYE) in the backbone can be prepared from the reaction of a solution containing a suitable sulfonated polyol with diisocyanate in the presence of a catalyst, followed by the slow addition of a solution containing the REACTINT® dye. Suitable polyols are preferably those of a low molecular weight and a high degree of sulfonation. These polyols are generally prepared by the partial polycondensation reaction of a dicarboxylic acid or mixtures of dicarboxylic acids, and preferably dimethylterephthalate and 5-sulfo-dimethylterephthalate, and a glycol or mixture thereof, and preferably 1,2 propane diol and diethylene glycol. The degree of sulfonation in the polyol is typically between 5 and 50 mol percent, and preferably between 7.5 mol percent and 20 mol percent of the polymer repeat unit. The molecular weights of polyols are, for example, from about $M_w$=from about 400 to about 1,800, $M_n$=of from about 200 to about 1,400 and preferably an $M_w$=to about 700 to about 1,400 and $M_n$=from about 400 to about 1,100. A number of alkyl and aryl diisocyanates can be used in the preparation of these polymers, for example tolyl diisocyanate, diisocyanate, hexamethylene diisocyanate, diisocyanatododecane, diisocyanatobutane, diisocyanato-2-methylpentane, and the like, and preferably tolyl diisocyanate. Various catalysts can be selected as indicated herein, but preferably the catalyst is either the Uniroyal Unicure M catalyst (4,4'-methylenebis (2-chloroaniline) or dibutyltin dilaurate.

Suitable bifunctional hydroxy, amino terminated or other REACTINT® dyes for the dye chromophore may be black, cyan, magenta, yellow, red, blue, green, brown, mixtures thereof, and the like, present in the ink in an effective amount of, for example, from about 1 to about 65, and preferably from about 2 to about 35 percent by weight of the ink, and preferably in an amount of from about 1 to about 15 weight percent. Preferred dyes are cyan and magenta dyes available from Milliken, such as cyan REACTINT® X17AB, REACTINT® X3LV, PALMER BLUE®, from the reactions of the polyol, dye diol, diisocyanate spacer in solvent at between about 50° C. to about 70° C. with reaction times of, for example, between about 5 to about 10 hours. Typically, reaction solvents include known organic solvents, such as methyl ethylketone (MEK) or tetrahydrofuran (THF). Reaction completion is monitored by the loss (>90 percent) of the unreacted diisocyanate resonances at 2,116 cm$^{-1}$ by IR of the solvent mixtures, and more specifically, by gel permeation chromatography (GPC). The sulfopolyurethanes containing dyes generally possess, for example, an $M_w$ of between about 2,000 to about 20,000 and an $M_n$ of between about 1,000 and about 10,000.

Other colorants, such as pigments, mixtures of pigments and dyes, and the like, can be selected in embodiments of the present invention.

The ink compositions of the present invention are suitable for use in ink jet printing processes such as continuous stream, piezoelectric drop-on-demand, bubble jet or thermal ink jet processes. Generally, the process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ™ printer, Hewlett Packard DESK JET™ printers, the DIABLO C150 TIJ™ printer, or the like. Particularly preferred is a thermal ink jet printing apparatus. The inks of the present invention can be used to form images on a wide variety of substrates, including plain paper such as Xerox 4024 paper, bond paper such as GILBERT® 25 percent cotton bond paper or GILBERT® 100 percent cotton bond paper, silica coated papers, transparency materials, fabrics, plastics, polymeric films, and the like.

The following Examples are being submitted to further define various species of the present invention. These Examples are intended to be illustrative only and are not intended to limit the scope of the present invention. Also, parts and percentages are by weight unless otherwise indicated.

EXAMPLES

Preparation of Low Molecular Weight Highly Sulfonated Polyols:

A series of low ($M_w$<1500) molecular weight sulfonated polyesters of dimethylterephthalate, 5-sulfodimethylterephthalate, diethylene glycol, and 1,2-propanediol were prepared as follows. Sulfonated polyesters with a degree of sulfonation of approximately 7, 10, and 20 mol percent were prepared. The procedure for the preparation of the polyols is essentially the same.

Sample A—7 Mol Percent Sulfonated Polyol:

A linear sulfonated random copolyester resin containing, on a mol percent basis, approximately 0.43 of terephthalate, 0.070 of sodium sulfoisophthalate, 0.463 of 1,2-propanediol, and 0.0375 of diethylene glycol was prepared as follows. In a one liter Parr reactor equipped with a bottom drain valve, double turbine agitator, and distillation receiver with a cold water condenser were charged 250 grams of dimethylterephthalate, 62.2 grams of sodium dimethylsulfoisophthalate, 211 grams of 1,2-propanediol (1 mole excess of glycols), 23.87 grams of diethylene glycol (1 mole excess of glycols), and 0.8 gram of butyltin hydroxide oxide as the catalyst. The reactor was then heated to 165° C. with stirring for 3 hours and 115 grams of distillate were collected in the distillation receiver, and which distillate was comprised of about 98 percent by volume of methanol and 2 percent by volume of 1,2-propanediol as measured by the ABBE refractometer available from American Optical Corporation. The mixture was then heated to 190° C. over a one hour period, after which the pressure was slowly reduced from atmospheric pressure to about 260 Torr over a one hour period, and then reduced to 5 Torr over a two hour period with the collection of approximately 100 grams of distillate in the distillation receiver comprised of approximately 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 480 grams of the sulfonated-polyester resin, copoly(1,2-propylene-diethylene)terephthalate-copoly(sodium sulfoisophthalate dicarboxylate), for example about 7.0 mol percent degree, or amount based, for example, on the polymer repeat segment. The sulfonated-polyol resin glass transition temperature was measured to be 0° C. (onset) utilizing the 910 Differential Scanning Calorimeter, available from E.I. DuPont, operating at a heating rate of 10° C. per minute. The number average molecular weight was measured to be 702 grams per mole, and the weight average molecular weight was measured to be 800 grams per mole using tetrahydrofuran as the solvent.

Sample B—10 Mol Percent Sulfonated Polyol:

A linear sulfonated random copolyester resin containing, on a mol percent basis, approximately 0.40 of terephthalate, 0.10 of sodium sulfoisophthalate, 0.463 of 1,2-propanediol, and 0.0375 of diethylene glycol was prepared as in Sample A. Recovered from the reactor were 480 grams of the sulfonated-polyester resin, copoly(1,2-propylene-diethylene) terephthalate-copoly(sodium sulfoisophthalate dicarboxylate), for example about 10.0 mol percent degree, or amount based, for example, on the polymer repeat segment. The sulfonated-polyol resin glass transition temperature was measured to be 42° C. (onset) utilizing the 910 Differential Scanning Calorimeter, available from E.I. DuPont, operating at a heating rate of 10° C. per minute. The number average molecular weight was measured to be 950 grams per mole, and the weight average molecular weight was measured to be 1,250 grams per mole using tetrahydrofuran as the solvent.

Sample C—20 Mol Percent Sulfonated Polyol:

A linear sulfonated random copolyester resin containing, on a mol percent basis, approximately 0.30 of terephthalate, 0.20 of sodium sulfoisophthalate, 0.463 of 1,2-propanediol, and 0.0375 of diethylene glycol was prepared as in Sample A: Recovered from the reactor was 480 grams of the sulfonated-polyester resin, copoly(1,2-propylene-diethylene) terephthalate-copoly(sodium sulfoisophthalate dicarboxylate), for example about 20.0 mol percent degree, or amount based, for example, on the polymer repeat segment. The sulfonated-polyol resin glass transition temperature was measured to be 30° C. (onset) utilizing the 910 Differential Scanning Calorimeter, available from E.I. DuPont, operating at a heating rate of 10° C. per minute. The number average molecular weight was measured to be 750 grams per mole, and the weight average molecular weight was measured to be 940 grams per mole using tetrahydrofuran as the solvent.

Sample D—30 Mol Percent Sulfonated Polyol:

A linear sulfonated random copolyester resin containing, on a mol percent basis, approximately 0.50 of terephthalate, 0.30 of sodium sulfoisophthalate, 0.463 of 1,2-propanediol, and 0.0375 of diethylene glycol was prepared as in Sample A. Recovered from the reactor were 480 grams of the sulfonated-polyester resin, copoly(1,2-propylene-diethylene) terephthalate-copoly(sodium sulfoisophthalate dicarboxylate), for example about 30 mol percent degree, or amount based, for example, on the polymer repeat segment. The sulfonated-polyol resin glass transition temperature was measured to be 10° C. (onset) utilizing the 910 Differential Scanning Calorimeter, available from E.I. DuPont, operating at a heating rate of 10° C. per minute. The number average molecular weight was measured to be 800 grams per mole, and the weight average molecular weight was measured to be 1,050 grams per mole using tetrahydrofuran as the solvent.

EXAMPLE I

Small Scale Preparation of Magenta Containing Sulfonated Polyurethanes:

A polymer with the composition of one part polyol, one part diisocyanate linkage, and one part magenta chromophore was prepared as follows. To a 3-neck round bottom flask (250 milliliters) charged with 50 milliliters of THF were added 2 grams of 10 mol percent sulfonated polyol, 1.11 grams of tolyidiisocyanate, and 10 milligrams of the Uniroyal Unicure M catalyst, 4,4'-methylenebis(2-chloroaniline). The resulting mixture was refluxed at 60° to 70° C. for one hour, after which a THF solution (20 milliliters) containing 2.4 grams of the magenta dye, REACTIN® RED X52, was added slowly via syringe pump. The reaction was retained at reflux for 12 hours and monitored by IR spectroscopy for the disappearance of the diisocyanate peak. Reaction was found to be essentially complete after about 5 to 7 hours. The solvent was removed under reduced pressure and the magenta polymer recovered as a flaky, dry material. The sulfonated-polyol resin grams less transition temperature was measured to be 28° C. (onset), operating at a heating rate of 10° C. per minute. The number average molecular weight of the resin product was measured to be 1,800 grams per mole, and the weight average molecular weight was measured to be 3790 grams per mole using tetrahydrofuran as the solvent.

EXAMPLE II
Larger Scale Preparation of Magenta Containing Sulfonated Polyurethanes:

A polymer with the composition of one part polyol, one part diisocyanate linkage, and one part magenta chromophore was prepared as follows. To a 3-neck round bottom flask (500 milliliters) charged with 250 milliliters of THF were added 10 grams of 10 mol percent sulfonated polyol, 5.57 grams of tolyldiisocyanate, and 30 milligrams of Uniroyal Unicure M catalyst, 4,4'-methylenebis(2-chloroaniline). The resulting mixture was refluxed at 60° to 70° C. for one hour, after which a THF solution (100 milliliters) containing 12 grams of the magenta dye, REACTIN® RED X52, was added slowly via syringe pump. The reaction was retained at reflux for 12 hours and monitored by IR spectroscopy for the disappearance of the diisocyanate peak. Reaction was found to be essentially complete after 5 to 7 hours. The solvent was removed under reduced pressure (5 Torr) and the magenta polymer recovered as a flaky, dry material. The sulfonated-polyol resin glass transition temperature was measured to be 25° C. (onset), operating at a heating rate of 10° C. per minute. The number average molecular weight of the product was measured to be 1,780 grams per mole, and the weight average molecular weight was measured to be 4,320 grams per mole using tetrahydrofuran as the solvent.

EXAMPLE III
Smaller Scale Preparation of Cyan Containing Sulfonated Polyurethanes:

A polymer with the composition of one part polyol, one part diisocyanate linkage, and one part magenta chromophore was prepared as follows. To a 3-neck round bottom flask (250 milliliters) charged with 50 milliliters of THF were added 2 grams of 10 mol percent sulfonated polyol, 1.11 grams of tolyldiisocyanate, and 10 milligrams of Uniroyal Unicure M catalyst, 4,4'-methylenebis(2-chloroaniline). The mixture was refluxed at 60 to 70° C. for one hour, after which a THF solution (20 milliliters) containing 2.4 grams of the cyan dye, REACTINT® DYE XL3V, was added slowly via syringe pump. The reaction was kept at reflux for 12 hours and monitored by IR spectroscopy for the disappearance of the diisocyanate peak. Reaction was found to be essentially complete after 5 to 7 hours. The solvent was removed under reduced pressure and the magenta polymer recovered as flaky, dry material. The sulfonated-polyol resin glass transition temperature was measured to be 25° C. (onset), operating at a heating rate of 10° C. per minute. The number average molecular weight thereof was measured to be 2,160 grams per mole, and the weight average molecular weight was measured to be 5,890 grams per mole using tetrahydrofuran as the solvent.

EXAMPLE IV
Larger Scale Preparation of Cyan Containing Sulfonated Polyurethanes:

A polymer with the composition of one part polyol, one part diisocyanate linkage, and one part magenta chromophore was prepared as follows. To a 3-neck round bottom flask (500 milliliters) charged with 80 milliliters of THF were added 7 grams of 10 mol percent sulfonated polyol, 4.49 grams of tolyidiisocyanate, and 10 milligrams of Uniroyal Unicure M catalyst, 4,4'-methylenebis(2-chloroaniline). The mixture was refluxed at 60 to 70° C. for one hour, after which a THF solution (50 milliliters) containing 7.0 grams of the cyan dye, REACTINT® DYE XL3V, was added slowly via syringe pump. The reaction was retained at reflux for 12 hours and monitored by IR spectroscopy for the disappearance of the diisocyanate peak. The reaction was found to be essentially complete after 5 to 7 hours. The solvent was removed under reduced pressure and the magenta polymer recovered as flaky, dry material. The sulfonated-polyol resin glass transition temperature was measured to be 22° C. (onset), operating at a heating rate of 10° C. per minute. The number average molecular weight of the resin product was measured to be 1,370 grams per mole, and the weight average molecular weight was measured to be 4,500 grams per mole using tetrahydrofuran as the solvent.

EXAMPLE V
Preparation of Cyan Containing Sulfonated Polyurethanes:

A polymer with the composition of one part polyol, one part diisocyanate linkage, and one part magenta chromophore was prepared as follows. To a 3-neck round bottom flask (500 milliliters) charged with 80 milliliters of THF were added 7 grams of 10 mol percent sulfonated polyol, 5.5 grams of tolyldiisocyanate, and 10 milligrams of Uniroyal Unicure M catalyst, 4,4'-methylenebis(2-chloroaniline). The resulting mixture was refluxed at 60° to 70° C. for one hour, after which a THF solution (50.milliliters) containing 7.0 grams of the cyan dye, REACTINT® DYE X17AB, was added slowly via syringe pump. The reaction mixture was retained at reflux for 12 hours and monitored by IR spectroscopy for the disappearance of the diisocyanate peak. Reaction was found to be essentially complete after 5 to 7 hours. The solvent was removed under reduced pressure and the magenta polymer recovered as flaky, dry material. The sulfonated-polyol resin glass transition temperature was measured to be 28° C. (onset), operating at a heating rate of 10° C. per minute. The number average molecular weight of the resin was measured to be 1,060 grams per mole, and the weight average molecular weight was measured to be 2,800 grams per mole using tetrahydrofuran as the solvent.

PREPARATION OF INK DISPERSIONS
Example Preparation of a Magenta Ink Dispersion:

To the magenta polyurethane stock solution (12 grams of solution containing 25 percent by weight of the above prepared magenta polyurethane) was added water (5.98 grams), followed by sulfolane, (1 gram) butyl carbitol (1 gram) and sodium laurel sulfate (0.02 gram). The solution was stirred at room temperature, about 25° to about 35° C., for 1 hour; and the ink resulting was filtered through a 0.85 micron filter. The measurable physical qualities of the resulting ink were 2.62 cp, surface tension 35.1, pH=5.95, and a particle size by volume of 58 nanometers.

Jetting properties:

The magenta ink as formulated was jetted at 600 spi using an LYC printhead attached to an experimental Xerox print fixture, multiple pass at 100, 200 and 300 percent coverage on Xerox paper (4024) and on Xerox transparencies (B112). The ink was found to be quick drying, for example from about 5 to 20 seconds or less, and displayed excellent offset qualities with minimum or no charge in the optical density of the prints generated. The dissipatible inks also displayed excellent waterfastness properties, 80 to 99 percent of image retained when immersed in 25° C. deionized water for 1 to 2 minutes, and did not redissipate after printing.

Example Preparation of a Cyan Ink Dispersion:

To the cyan polyurethane prepared in Example III stock solution (22.5 grams of solution containing 20 percent by weight of the cyan polyurethane) was added water (4.47 grams), followed by sulfolane, (1.5 grams), butyl carbitol (1.5 grams) and sodium lauryl sulfate (0.03 gram). The solution was stirred at room temperature for 1 hour, and the ink was filtered through a 0.85 micron filter. The measurable physical qualities of the resulting ink were 3.23 cp, surface tension 35.1, and pH=5.52. No measurable particle size could be detected, with the ink being essentially totally soluble.

Jetting properties:

The magenta ink as formulated above was jetted at 600 spi using an LYC printhead attached to an experimental Xerox print fixture, multiple pass at 100, 200 and 300 percent coverage on Xerox paper (4024) and on Xerox transparencies (B112). The ink was found to be quick drying, 5 to 20 seconds or less, and displayed excellent offset qualities, that is with substantially no change in optical density of the resulting prints. The dissipatible inks also displayed excellent waterfastness properties of 80 to 99 percent of image retained when immersed in deionized water at room temperature, about 25° C., for 1 to 2 minutes, and did not redissipate after printing.

Other modifications of the present invention may occur to those of ordinary skill in the art subsequent to a review of the present application and these modifications, including equivalents thereof, are intended to be included within the scope of the present invention.

What is claimed is:

1. An ink composition consisting essentially of (a) water, and a dye containing dissipatible sulfonated polymer of the following formula

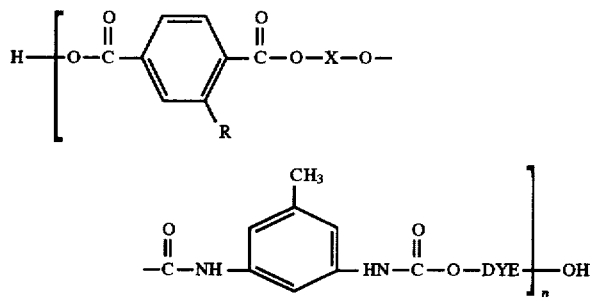

wherein R is m(H) and O($SO_3$—$Y^+$), wherein H is hydrogen, Y is an alkali cation or an alkaline earth cation, m is the mol fraction of hydrogen, and O is the mol fraction of sulfonate ($SO_3$—$Y^+$); X is a glycol, and n represents the number of repeating segments (b) a miscible organic solvent, and (c) a surfactant and wherein said dye is covalently linked to said polymer.

2. An ink in accordance with claim 1 wherein the sulfonated polymer is an oligomer comprised of alternating sulfopolyester and dye chromophore segments linked by a urethane linking group, and wherein m is a number of from about 0.8 to about 0.95, O is a number of from about 0.2 to about 0.05, n is a number of from 1 to about 7, and Y is sodium.

3. An ink in accordance with claim 2 wherein m is about 0.925, and O is about 0.075.

4. An ink in accordance with claim 2 wherein the sulfopolyester polymer is an oligomer with a weight average molecular weight of from about 2,000 to about 20,000.

5. An ink in accordance with claim 2 wherein the sulfopolyester polymer is an oligomer with a weight average molecular weight of from about 1,000 to about 10,000.

6. An ink in accordance with claim 2 wherein the sulfopolyester polymer contains from about 40 to about 60 weight percent of sulfonated polyester, from about 40 to about 60 weight percent of dye, and from about 2 to about 5 weight percent of said linking component, and wherein said weight percentages total 100.

7. An ink in accordance with claim 2 wherein about 50 mole percent of said glycol is present.

8. An ink in accordance with claim 7 wherein said glycol is comprised of a mixture of a first glycol and a second glycol, and wherein said first glycol is present in an amount of from about 25 to about 75 mole percent, and said second glycol is present in an amount of from about 25 to about 75 mole percent, and wherein the total weight percent of said first and said second glycol is about 100.

9. An ink in accordance with claim 8 wherein the first glycol is propylene glycol and the second glycol is diethylene glycol.

10. An ink in accordance with claim 9 wherein said first glycol is present in an amount of from about 20 to about 30 percent, and said second glycol is present in an amount of from about 70 to about 80 percent.

11. Ah ink in accordance with claim 1 wherein said glycol is an aliphatic glycol.

12. An ink in accordance with claim 1 wherein the dye is a cyan dye, or a magenta dye.

13. An ink in accordance with claim 1 wherein the sulfopolyester polymer is copoly(1,2-propylene-diethylene) terephthalate-copoly(sodium sulfoisophthalate dicarboxylate).

14. An ink in accordance with claim 1 wherein the dye is the dihydroxy terminated REACTINT® DYE cyan REACTINT® X17AB, REACTINT® X3LV, PALMER BLUE®, REACTINT® Blue X19, magenta REACTINT® Red X52, REACTINT® Yellow X15, REACTINT® Black 57AB, REACTINT® Black X40LV, REACTINT® Orange X38, REACTINT® Violet X80, or mixtures thereof.

15. An ink in accordance with claim 1 further containing a glycol humectant present in an amount of from about 2 to about 50 percent by weight.

16. An ink in accordance with claim 1 wherein X is a 1,2-propanediol or diethylene glycol, and the DYE is a REACTINT® dye with hydroxy terminated ends.

17. An ink in accordance with claim 1 wherein said sulfopolyester component is prepared by the reaction of a low molecular weight of from about 500 to about 1,500 of sulfopolyester oligomer, a hydroxy terminated dye, and a diisocyanate, and which reaction is accomplished in the presence of a catalyst.

18. An ink in accordance with claim 17 wherein said reaction is accomplished by heating.

19. An ink in accordance with claim 17 wherein said reaction is accomplished by heating at a temperature of from about 25° to about 80° C.

20. An ink in accordance with claim 17 wherein said diisocyanate is tolyl diisocyanate, said dye is the hydroxy-terminated dye REACTINT® Red X52 or REACTINT® Blue XL3V.

21. An ink in accordance with claim 17 wherein said catalyst is 4,4'-methylenebis(2-chloroaniline).

22. An ink in accordance with claim 17 wherein the dye is the dihydroxy terminated REACTINT® Dye cyan REACTINT® X17AB, REACTINT® X3LV, PALMER BLUE®, REACTINT® Blue X19, magenta REACTINT® Red X52, REACTINT® Yellow X15, REACTINT® Black 57AB, REACTINT® Black X40LV, REACTINT® Orange X38, REACTINT® Violet X80, or mixtures thereof.

23. A printing process which comprises (1) incorporating into an ink jet printing apparatus the ink composition of claim 1, and (2) causing droplets of the ink to be ejected in an imagewise pattern onto a substrate, thereby generating images on the substrate.

24. A printing process in accordance with claim 23 wherein the ink jet printing apparatus employs a thermal ink jet printing process, and wherein there are provided prints on paper with solid area coverage having an optical density of from about 0.001 to about 0.05, and wherein the prints possess a waterfastness of from about 80 percent to about 99 percent.

25. An ink in accordance with claim 1 wherein X is a 1,2-propanediol glycol or diethylene glycol, and the DYE is a REACTINT® dye with hydroxy terminated ends.

26. An ink in accordance with claim 1 wherein Y is sodium.

27. An ink in accordance with claim 1 wherein DYE is a colorant.

28. An ink in accordance with claim 1 wherein DYE is a pigment.

29. An ink in accordance with claim 1, wherein said miscible organic solvent is a sulfolane.

30. An ink in accordance with claim 1, wherein said miscible organic solvent is comprised of a mixture of a sulfolane and butyl carbitol.

31. An ink in accordance with claim 1, wherein the surfactant is sodium laurel sulfate.

32. An ink in accordance with claim 1, further containing polymeric additives.

33. An ink in accordance with claim 32, wherein said additives are present in the amount of 1 to about 15 weight percent and which additives enhance the viscosity of the ink.

34. An ink in accordance with claim 33, wherein said additives are comprise of water soluble polymers.

35. A process in accordance with claim 23, wherein said sulfonated polymer is an oligomer comprised of alternating sulfopolyester and dye chromophore segments linked by a urethane linking group, and wherein m is a number of from about 0.8 to about 0.95, O is a number of from about 0.2 to about 0.05, n is a number of from 1 to about 7, and Y is sodium.

36. A process in accordance with claim 35, wherein said sulfopolyester is an oligomer with a weight average molecular weight of from about 2,000 to about 20,000, and wherein said sulfonated polymer contains from about 40 to about 60 weight percent of sulfonated polyester, from about 40 to about 60 weight percent of dye, and from about 2 to about 5 weight percent of said linking component wherein said weight percentages total about 100 percent.

37. A process in accordance with claim 23, wherein said miscible organic solvent is comprised of a mixture of sulfolane and butyl carbitol and said surfactant is sodium laurel sulfate.

\* \* \* \* \*